United States Patent
Lee (10) Patent No.: US 12,337,836 B2
(45) Date of Patent: Jun. 24, 2025

(54) APPARATUS AND METHOD FOR CONTROLLING VEHICLE

(71) Applicant: HL KLEMOVE CORP., Incheon (KR)

(72) Inventor: Ji Yong Lee, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 281 days.

(21) Appl. No.: 17/866,961

(22) Filed: Jul. 18, 2022

(65) Prior Publication Data

US 2023/0022662 A1    Jan. 26, 2023

(30) Foreign Application Priority Data

Jul. 23, 2021  (KR) .......................... 10-2021-0097026

(51) Int. Cl.
*B60W 30/095* (2012.01)
*B60W 30/09* (2012.01)

(52) U.S. Cl.
CPC ........ *B60W 30/0956* (2013.01); *B60W 30/09* (2013.01); *B60W 2554/20* (2020.02); *B60W 2554/801* (2020.02); *B60W 2554/802* (2020.02); *B60W 2554/803* (2020.02)

(58) Field of Classification Search
None
See application file for complete search history.

(56) References Cited

U.S. PATENT DOCUMENTS

| | | | |
|---|---|---|---|
| 10,944,893 B1* | 3/2021 | Daulton | G06F 1/1632 |
| 2008/0312834 A1* | 12/2008 | Noda | B60T 7/22 |
| | | | 701/301 |
| 2011/0018737 A1* | 1/2011 | Hsu | G08G 1/161 |
| | | | 340/903 |
| 2017/0061203 A1* | 3/2017 | Takatani | G06V 40/103 |
| 2018/0218227 A1* | 8/2018 | Takaki | B60W 30/0956 |
| 2019/0337510 A1* | 11/2019 | Song | G06V 20/56 |
| 2020/0139962 A1* | 5/2020 | Kim | B60W 10/18 |
| 2021/0031625 A1 | 2/2021 | Choi | |
| 2021/0394778 A1* | 12/2021 | Oh | B60W 30/09 |
| 2022/0017080 A1* | 1/2022 | Moriya | B60W 30/09 |

(Continued)

FOREIGN PATENT DOCUMENTS

| | | |
|---|---|---|
| CN | 104796612 | 7/2015 |
| CN | 105398389 | 3/2016 |

(Continued)

OTHER PUBLICATIONS

Office Action (1st) dated Apr. 23, 2025 for Chinese Patent Application No. 202210879103.4 and its English translation provided by Applicant's foreign counsel.

*Primary Examiner* — Christian Chace
*Assistant Examiner* — Shayne M. Gilbertson
(74) *Attorney, Agent, or Firm* — WOMBLE BOND DICKINSON (US) LLP (57) ABSTRACT

The present disclosure relates to an apparatus and a method for controlling a vehicle, and, particularly, an apparatus and a method for controlling a vehicle capable of preventing a collision accident in advance by expanding a detection area of a vehicle by monitoring a lower end of a parked/stopped vehicle by adjusting a rotation angle of a sensor attached to the lower end of the vehicle on a front side and predicting a situation having a risk for a collision that may occur due to a blind spot in advance can be provided.

13 Claims, 7 Drawing Sheets

(56) References Cited

U.S. PATENT DOCUMENTS

2022/0109822 A1\* 4/2022 Winter ................. H04N 23/695
2023/0227030 A1\* 7/2023 Izumi ........................ B60T 7/12
                                                                                              701/45

FOREIGN PATENT DOCUMENTS

| CN | 110435646 | 11/2019 |
| CN | 110481544 | 11/2019 |

\* cited by examiner

APPARATUS AND METHOD FOR CONTROLLING VEHICLE

CROSS-REFERENCE TO RELATED APPLICATION

This application claims priority from Korean Patent Application No. 10-2021-0097026, filed on Jul. 23, 2021, which is hereby incorporated by reference for all purposes as if fully set forth herein.

BACKGROUND OF THE INVENTION

Field of the Invention

Embodiments relate to an apparatus and a method for controlling a vehicle.

Description of Related Art

Recently, consumers are deeply interested in performance and safety of vehicles. In accordance with increases of requests for performance of vehicles and convenience and safety of drivers, researches and developments on Advanced Driver Assistance Systems (ADAS) assisting driver's vehicle driving by controlling vehicles tend to continuously advance. Here, the Advanced Driver Assistance Systems (ADAS) represent various systems minimizing or presenting damages caused by vehicle accidents by allowing a driver to take an appropriate countermeasure based on external environment information detected by a vehicle sensor, a camera, and the like or building a safer driving environment by automatically controlling a vehicle. Particularly, an ADAS sensor is an essential element of cutting-edge driver assistance systems that are bases for achieving objects of securement of safety and improvement of convenience of drivers for the purpose of realization of autonomous vehicles, and a rapid market growth thereof is expected in the future.

In addition, detection & prediction technologies of ADAS sensors have been enhanced every year and have approached performance of a degree with which autonomous traveling can be considered at present. However, such technologies are applicable only in a case where a specific object is present within a field of view (FOV). Particularly, since ADAS sensors are mounted to a bumper or a windshield of a vehicle as mounting positions, an object that is present at a blind spot cannot be detected in advance. In accordance with this, in-advance preparation for an object coming out from between vehicles cannot be made, and there is a problem in that an occurrence of a collision accident is unavoidable in a case where a detection time point is too late.

Thus, an apparatus and a method for controlling a vehicle that prevent an accident in advance by monitoring of an area that could not be detected by an existing ADAS sensor and predicting a situation of a collision risk in advance are required.

SUMMARY OF THE INVENTION

In such a background, embodiments can provide an apparatus and a method for controlling a vehicle that are capable of preventing a collision accident that can occur due to a blind spot in advance.

According to embodiments of one aspect, there is provided a vehicle control apparatus including: a position detector that detects whether a parked/stopped vehicle is positioned on a left side or a right side with reference to a traveling direction of a vehicle using a first sensor of the vehicle; an angle adjuster that adjusts a rotation angle of a second sensor attached to a lower end of the vehicle on a side face on which the parked/stopped vehicle is positioned; and a controller that sets a moving object as a target by monitoring a lower end of the parked/stopped vehicle using the second sensor and performs control based on the target such that a notification is given to the vehicle, or the vehicle is decelerated.

According to embodiments of another aspect, there is provided a vehicle control method including: detecting whether a parked/stopped vehicle is positioned on a left side or a right side with reference to a traveling direction of a vehicle using a first sensor of the vehicle; adjusting a rotation angle of a second sensor attached to a lower end of the vehicle on a side face on which the parked/stopped vehicle is positioned; and setting a moving object as a target by monitoring a lower end of the parked/stopped vehicle using the second sensor and performing control based on the target such that a notification is given to the vehicle, or the vehicle is decelerated.

According to these embodiments, an apparatus and a method for controlling a vehicle capable of preventing a collision accident, which can occur due to a blind spot in advance, by expanding a detection area of the vehicle.

DETAILED DESCRIPTION OF THE INVENTION

The present disclosure relates to an apparatus and a method for controlling a vehicle.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
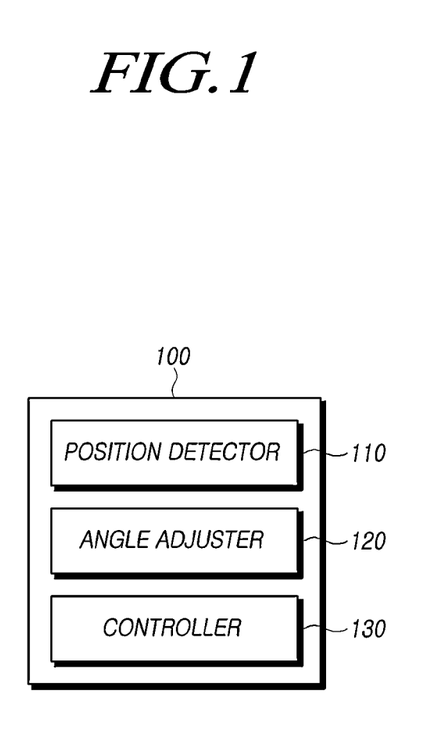
FIG. 1 is a diagram illustrating a configuration of a vehicle control apparatus according to one embodiment of the present disclosure.

FIG. 1 is a diagram illustrating a configuration of a vehicle control apparatus according to one embodiment of the present disclosure.

Referring to FIG. 1, the vehicle control apparatus (100) according to one embodiment of the present disclosure may include: a position detector (110) that detects whether a parked/stopped vehicle is positioned on a right side or a left side with reference to a traveling direction of a vehicle using a first sensor of the vehicle; an angle adjuster (120) that adjusts a rotation angle of a second sensor attached to a lower end of the vehicle on a side face on which the parked/stropped vehicle is positioned; and a controller (130) that performs monitoring of the lower end of the parked/stopped vehicle using the second sensor, sets a moving object as a target, and controls notification or deceleration based on the target.

As one example, the position detector (110) may detect another vehicle positioned within a predetermined distance from the vehicle using the first sensor of the vehicle. In addition, the position detector (110) may determine whether or not the other vehicle detected based on a relative speed of the other vehicle acquired using the first sensor of the vehicle corresponds to a parked/stopped vehicle. For example, the position detector (110) may detect objects present on a front side, a front lateral side, and a rear lateral side of the vehicle using the first sensor. The position detector (110) may acquire information about a distance, a relative speed, and a relative acceleration between the vehicle and a detected object using the first sensor. For a more specific example, the position detector (110) may determine whether or not another vehicle is a parked/stopped vehicle by detecting the other vehicle using a camera and checking a relative speed of the other vehicle using a radar.

Here, the first sensor may be configured using one or more various known sensors including a camera, an infrared camera, a radar, a lidar, an ultrasonic wave, and the like installed at positions appropriate for detecting the front side of the vehicle. The first sensor may be installed at a room mirror, a grille, a position near a headlamp, and the like for detecting objects on the front side of the vehicle. However, the configuration is not limited thereto.

As another example, the position detector (110) may detect whether a parked/stopped vehicle is positioned on the left side or the right side with reference to a traveling direction of the vehicle using the first sensor. For example, the position detector (110) may determine a parked/stopped vehicle that is the closest from the vehicle among parked/stopped vehicles determined using the first sensor. Then, the position detector (110) may detect whether the closest parked/stopped vehicle is positioned on the left side or the right side with reference to the traveling direction of the vehicle.

As one example, the angle adjuster (120) may adjust a rotation angle of a second sensor attached to a lower end of the vehicle on a side face on which the parked/stopped vehicle is positioned. For example, the angle adjuster (120) may adjust a rotation angle such that the second sensor is rotated based on the traveling direction of the vehicle and the position of the parked/stopped vehicle. For a more specific example, if the closest parked/stopped vehicle is detected to be positioned on the left side with reference to the traveling direction of the vehicle, the angle adjuster (120) may adjust the rotation angle such that the second sensor is rotated in a leftward direction. On the other hand, if the closest parked/stopped vehicle is detected to be positioned on the right side with reference to the traveling direction of the vehicle, the angle adjuster (120) may adjust the rotation angle such that the second sensor is rotated in a rightward direction.

Here, the second sensor is an additional sensor other than the first sensor and may be various known sensors such as a camera, an infrared camera, a radar, a lidar, ultrasonic waves, and the like attached to a lower end of the vehicle on the front side to be appropriate for detecting a lower end on the front side and a lower end on the front lateral side. However, the configuration is not limited thereto. In addition, the second sensor may be installed to be able to adjust the rotation angle. More specifically, although the second sensor may use a motor or the like for adjusting the rotation angle, the second sensor may use any as long as it corresponds to a device that is able to adjust the rotation angle.

As another example, the angle adjuster (120) may set a threshold range of the rotation angle based on a field of view (FOV) of the second sensor and adjust the rotation angle within the threshold range in accordance with movement of the vehicle with reference to the parked/stopped vehicle. For example, if the field of view of the second sensor is equal to or larger than 100 degrees, the angle adjuster (120) may set the threshold range of the rotation angle of the second sensor to be within 45 degrees. Thus, if the second sensor is rotated within 45 degrees before the vehicle catches up with the parked/stopped vehicle, the angle adjuster (120) may be able to monitor a lower part of the parked/stopped vehicle. However, this is an example, and the configuration is not limited thereto.

As one example, the controller (130) may perform monitoring of a lower end of the parked/stopped vehicle using the second sensor and set a moving object as a target. For example, the controller (130) may perform monitoring of movement inside a lower end space of the parked/stopped vehicle using the second sensor and set a moving object as a target. In addition, the controller (130) may control notification or deceleration based on the set target. For example, the controller (130) may determine a degree of risk for a collision with a target according to various situations by performing a predetermined algorithm or a predetermined logic using information of the second sensor. Then, the controller (130) may perform control such that a method for giving a notification to a driver is diversified in accordance with a degree of risk for a collision with a target, and deceleration or braking is automatically performed if necessary. Here, the controller (130) may be an electronic control unit (ECU), a micro control unit (MCU), or the like.

As one example, the controller (130) may acquire a lateral speed of a target that is set using the second sensor and a longitudinal distance of and a lateral distance of the target that are distances between the vehicle and a set target. In addition, the controller (130) may determine a time to collision (TTC) with the target based on the lateral speed, the longitudinal distance, and the lateral distance that have been acquired. For example, the controller 130 may determine a time to collision including a first time to collision and a second time to collision using at least one of the acquired lateral speed, longitudinal distance, or lateral distance that has been acquired. Here, the first time to collision may be a ratio of the longitudinal distance to the speed of the vehicle, and the second time to collision may be a ratio of the difference value between lateral distance and lateral speeds to the lateral speeds. In other words, the lateral speed may represent a movement distance of the target moved in the lateral direction for one second.

As another example, the controller (130) may compare the determined time to collision with the target with a reference time set in advance. Then, the controller (130) may perform control based on a result of the comparison such that a notification is given to the vehicle, or the vehicle is decelerated. For example, if the first time to collision and the second time to collision are determined to be shorter than a first reference time, the controller (130) may perform control such that a notification is given to the vehicle. For a more specific example, the controller (130) may perform control such that a notification is given to the vehicle using a visible warning, an audible warning, a haptic warning, or the like in accordance with the result of the determination. Alternatively, the controller (130) may perform control such that an alarm is given by changing a combination of alarms or an amount of alarm in accordance with a degree of a driver's recognition of a collision risk.

As another example, if the first time to collision and the second time to collision are determined to be shorter than a second reference time, the controller (130) may perform control such that the vehicle performs partial braking. For a more specific example, if a full braking force is defined as 1 g, the controller (130) may perform control such that the vehicle performs partial braking by transferring a partial braking command of about 0.2 g to a braking device in accordance with a result of the determination. Such a braking force may be changed based on a design type of the vehicle, a type of vehicle, and the like but is not limited thereto. Here, the partial braking may represent a braking force having a magnitude smaller than that of emergency braking of the braking device. For another specific example, the controller (130) may perform control such that partial braking is performed by changing the braking force based on a difference between the time to collision and the second reference time. The controller (130) may perform control such that partial braking is performed in multiple levels by forming a plurality of sections in accordance with a difference between the time to collision and the second reference time and applying 0.2 g, 0.4 g, 0.6, or the like in accordance with a corresponding section. In other words, the controller (130) may perform control such that partial braking is performed by increasing a braking force in accordance with a decrease in the determined time to collision.

In addition, as another example, if the first time to collision and the second time to collision are determined to be shorter than a third reference time, the controller (130) may perform control such that the vehicle performs emergency braking. For a more specific example, if a full braking force is defined as 1 g, the controller 130 may perform control such that the vehicle performs emergency braking by transferring an emergency braking command of about 1 g to the braking device in accordance with a result of the determination. Here, the emergency braking may represent full braking. On the other hand, the controller (130) may maintain provision of an alarm while performing partial braking or emergency braking.

Figure 2:
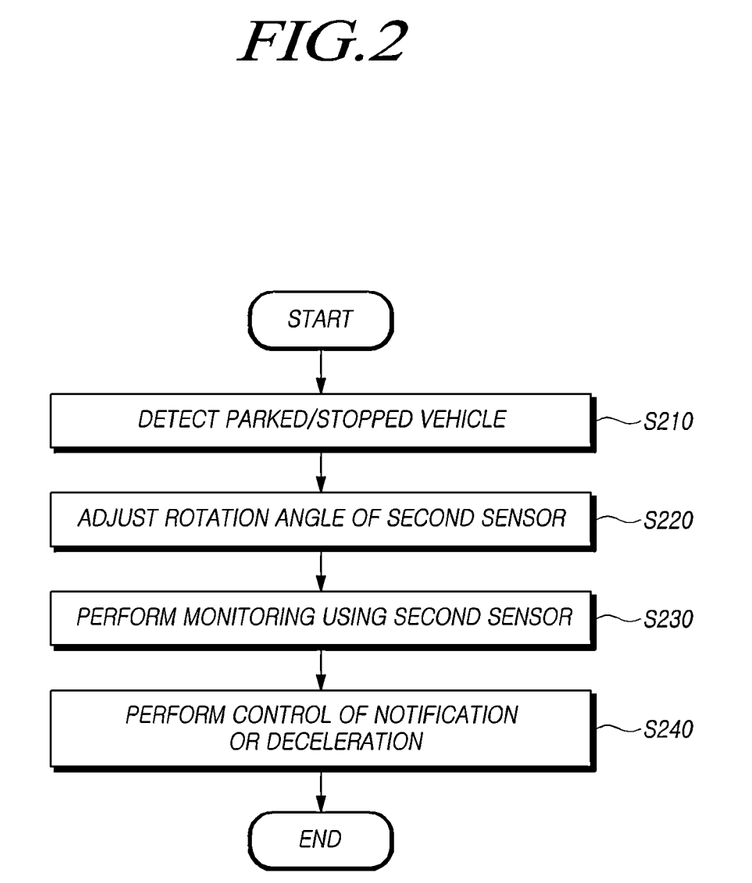
FIG. 2 is a flowchart illustrating an operation of a vehicle control apparatus according to one embodiment of the present disclosure as an example.

FIG. 2 is a flowchart illustrating an operation of a vehicle control apparatus according to one embodiment of the present disclosure as an example.

Referring to FIG. 2, the position detector (110) according to one embodiment of the present disclosure may detect a parked/stopped vehicle (S210). For example, the position detector (110) may detect another vehicle positioned within a predetermined distance from the vehicle using the first sensor and determine whether the other vehicle corresponds to a parked/stopped vehicle based on a relative speed of the detected other vehicle. For example, the position detector (110) may detect a preceding vehicle positioned within a predetermined distance set in advance among preceding vehicles positioned on the front side or the front lateral side of the vehicle as another vehicle using the first sensor. In addition, even if a preceding vehicle is not within a predetermined distance set in advance, the position detector (110) may detect the preceding vehicle that is present within a minimal securement distance in accordance with the speed of the vehicle as another vehicle. The position detector (110) may determine whether or not other vehicles corresponds to parked/stopped vehicles by prioritizing other vehicles that are present within a predetermined distance set for each speed of the vehicle. As another example, the position detector (110) may determine whether or not another vehicle is a vehicle in a parked or stopped state based on relative speed information of the other vehicle and speed information of the vehicle using the first sensor. Then, the position detector (110) may detect whether the parked/stopped vehicle is positioned on a left side or a right side with reference to the traveling direction of the vehicle. Details of the operation for detecting the position of a parked/stopped vehicle will be described below with reference to FIG. 3.

The angle adjuster (120) according to one embodiment of the present disclosure may adjust a rotation angle of the second sensor (S220). For example, the angle adjuster (120) may adjust a rotation angle of the second sensor attached to the lower end of the vehicle on a side face on which the parked/stopped vehicle is positioned. For example, the angle adjuster (120) 120 may set a threshold range of the rotation angle based on the view of field of the second sensor and adjust the rotation angle within the set threshold range in accordance with movement of the vehicle with reference to a parked/stopped vehicle. For a more specific example, the angle adjuster (120) may set the threshold range of the rotation angle of the second sensor such that up to a parked/stopped vehicle positioned next to the vehicle can be monitored. Here, the threshold range of the rotation angle may be set to a value acquired by dividing an angle acquired by subtracting the field of view of the second sensor from 180 degrees by 2. If a parked/stopped vehicle is positioned inside the field of view of the second sensor, the angle adjuster (120) may maintain the rotation angle of the second sensor as an existing angle. On the other hand, if a parked/stopped vehicle is positioned outside the field of view of the second sensor, the angle adjuster (120) may adjust the rotation angle of the second sensor with reference to the position of this parked/stopped vehicle. On the other hand, the angle adjuster (120) may also adjust a rotation speed at which the second sensor is rotated based on the traveling speed of the vehicle.

The controller (130) according to one embodiment of the present disclosure may perform monitoring of the lower end of the parked/stopped vehicle using the second sensor (S230). As one example, the controller (130) may perform monitoring of the lower end of a parked/stopped vehicle using the second sensor and set a moving object as a target. For example, the controller (130) may detect a moving object by monitoring the lower end of a parked/stopped vehicle positioned on the front lateral side using the second sensor attached to the lower end of the vehicle. More specifically, the controller (130) may detect an angle, a distance, a relative speed, a relative acceleration, and the like with respect to an object present at the lower end of the parked/stopped vehicle using the second sensor and determine whether this object is a moving object. Then, if the object present at the lower end of the parked/stopped vehicle is determined to be a moving object, the controller (130) may set the object as a target.

The controller (130) may control notification or deceleration based on the target (S240). As one example, the controller (130) may determine a time to collision based on a lateral speed of the set target and a longitudinal distance and a lateral distance between the vehicle and the set target. In addition, the controller (130) may control notification or deceleration by comparing the time to collision with the first reference time, the second reference time, and the third reference time. Details of the operation of setting a target and determining a time to collision will be described below with reference to FIGS. 5 and 6.

Figure 3:
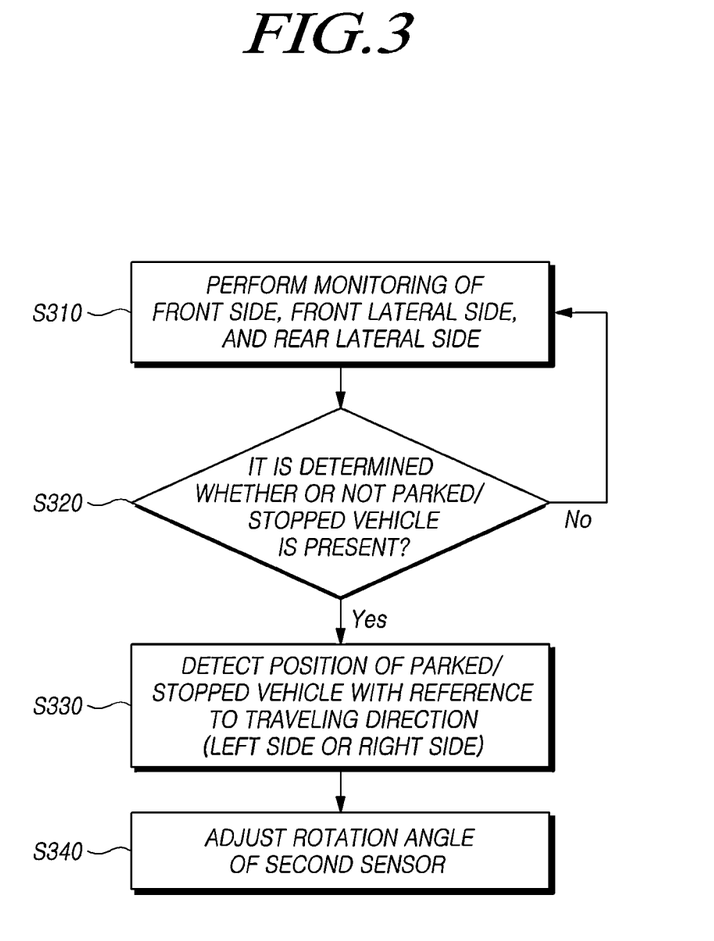
FIG. 3 is a flowchart illustrating an operation of detecting a position of a parked/stopped vehicle according to one embodiment of the present disclosure as an example.

FIG. 3 is a flowchart illustrating an operation of detecting a position of a parked/stopped vehicle according to one embodiment of the present disclosure as an example.

Referring to FIG. 3, the position detector (110) according to one embodiment of the present disclosure may perform monitoring of the front side, the front lateral side, and the rear lateral side of the vehicle (S310). As one example, the position detector (110) may perform monitoring of a traveling road of the vehicle or an object present on the front side using the first sensor installed at a position that is appropriate for monitoring the front side or the front lateral side of the vehicle. Alternatively, the position detector (110) may perform monitoring of an object present on the rear side of the vehicle using the first sensor installed at a position that is appropriate for monitoring the rear side of the vehicle. For example, in the position detector (110), the first sensor may be composed of one or more sensors, and each of the sensors may perform monitoring of a predetermined section. The first sensor represents sensors that are generally attached to a vehicle and may represent all the sensors other than the second sensor.

The position detector (110) according to one embodiment of the present disclosure may determine whether a parked/stopped vehicle is present (S320). As one example, the position detector (110) may detect another vehicle within a predetermined distance, which is positioned on the front side or the front lateral side of the vehicle, using the first sensor. Then, the position detector (110) may determine presence of a parked/stopped vehicle in accordance with whether the detected other vehicle is a parked or stopped vehicle. For example, the position detector (110) may determine whether or not the other vehicle corresponds to a parked/stopped vehicle based on the relative speed of the other vehicle acquired using the first sensor and the speed of the host vehicle. As another example, the position detector (110) may determine whether or not the other vehicle is a vehicle parked not on a traveling road but on a road side based on positions of left and right lanes of a traveling road on which the vehicle is traveling or a distance from an object such as a sidewalk block or a curb using the first sensor.

The position detector (110) according to one embodiment of the present disclosure may detect a position of a parked/stopped vehicle with reference to the traveling direction of the vehicle (S330). As one example, if a parked/stopped vehicle is determined to be present, the position detector (110) may detect the position of the parked/stopped vehicle with reference to the traveling direction of the vehicle. On the other hand, if no parked/stopped vehicle is determined to be present, the position detector (110) may perform monitoring of the front side, the front lateral side, and the rear lateral side of the vehicle for detecting other vehicles on the front side or the front lateral side of the vehicle again. For example, in a case where there are plurality of parked/stopped vehicles, the position detector (110) determines a parked/stopped vehicle closest from the vehicle with a first rank and may detect whether the determined parked/stopped vehicle is positioned on the left side or the right side with reference to the traveling direction of the vehicle.

The angle adjuster (120) according to one embodiment of the present disclosure may adjust a rotation angle of the second sensor (S340). As one example, the angle adjuster (120) may adjust the rotation angle of the second sensor attached to the lower end of the vehicle on the side face on which the parked/stopped vehicle is positioned. For example, the angle adjuster (120) may set a threshold range of the rotation angle based on the field of view of the second sensor and adjust the rotation angle within the set threshold range in accordance with movement of the vehicle with reference to the parked/stopped vehicle.

Figure 4:
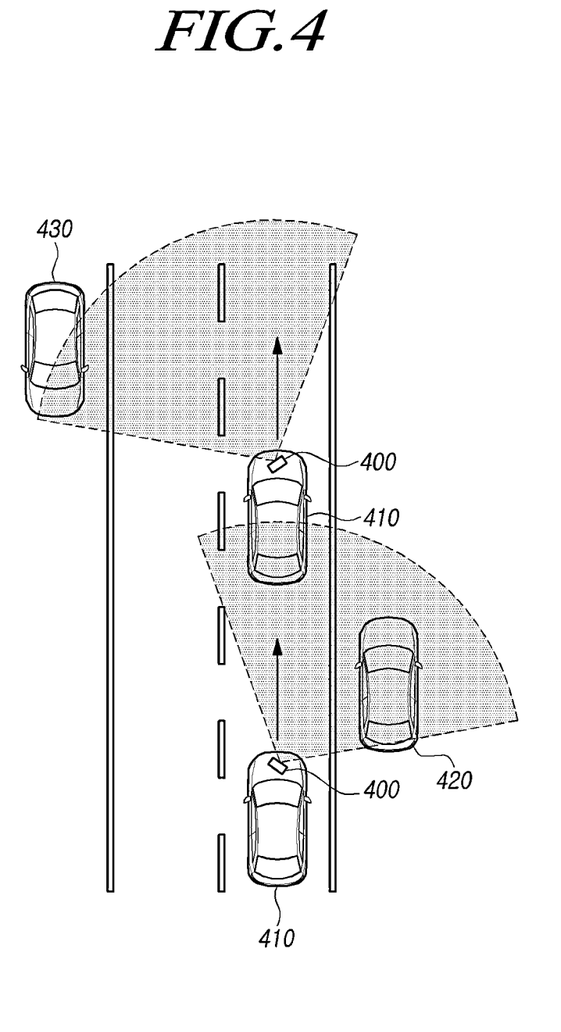
FIG. 4 is a diagram illustrating an operation of adjusting a rotation angle of a second sensor according to one embodiment of the present disclosure.

FIG. 4 is a diagram illustrating the operation of adjusting a rotation angle of the second sensor according to one embodiment of the present disclosure.

Referring to FIG. 4, the operation of the angle adjuster (120) according to one embodiment of the present disclosure for adjusting the rotation angle of the second sensor can be described more specifically. As one example, the angle adjuster (120) may adjust the rotation angle of the second sensor on a side face on which the parked/stopped vehicle is positioned. For example, the position detector (110) may detect a parked/stopped vehicle (420) on a side of a right road immediately adjacent to the traveling road on which the vehicle (410) is currently traveling. Then, the angle adjuster (120) may maintain the rotation angle of the second sensor (400) or adjust the rotation angle for rotation in a rightward direction based on whether or not the second sensor (400) of the vehicle (410) can perform monitoring of the lower end of the parked/stopped vehicle (420) on the side of the right road. On the other hand, the position detector (110) may detect a parked/stopped vehicle (430) on a side of a left road adjacent to the traveling road on which the vehicle (410) is currently traveling. Then, the angle adjuster (120) may maintain the rotation angle of the second sensor (400) or adjust the rotation angle for rotation in a leftward direction based on whether or not the second sensor (400) of the vehicle (410) can perform monitoring of the lower end of the parked/stopped vehicle (430) on the side of the right road. For a more specific example, if the parked/stopped vehicle (420) is positioned inside the field of view at an existing position of the second sensor (400) of the vehicle (410), the angle adjuster (120) may maintain the rotation angle of the second sensor (400). Alternatively, if the parked/stopped vehicle (420) is positioned outside the field of view at the existing position of the second sensor (400) of the vehicle (410), the angle adjuster (120) may maintain the rotation angle of the second sensor (400) such that the parked/stopped vehicle (420) is positioned inside the field of view of the second sensor (400).

As another example, the angle adjuster (120) may adjust the rotation angle of the second sensor (400) until the vehicle (410) precedes with reference to the parked/stopped vehicles (420, 430). More specifically, by setting a threshold range of the rotation angle and adjusting the rotation angle within the set threshold range, the angle adjuster (120) may not perform detection in a case where the vehicle (410) is positioned in front of the parked/stopped vehicle (420, 430) as references.

As another example, in adjusting the rotation angle of the second sensor (400) within the threshold range, the angle adjuster (120) may control a rotation speed based on the movement speed of the vehicle (410) such that the parked/stopped vehicles (420, 430) are positioned inside the field of vide of the second sensor (400).

Figure 5:
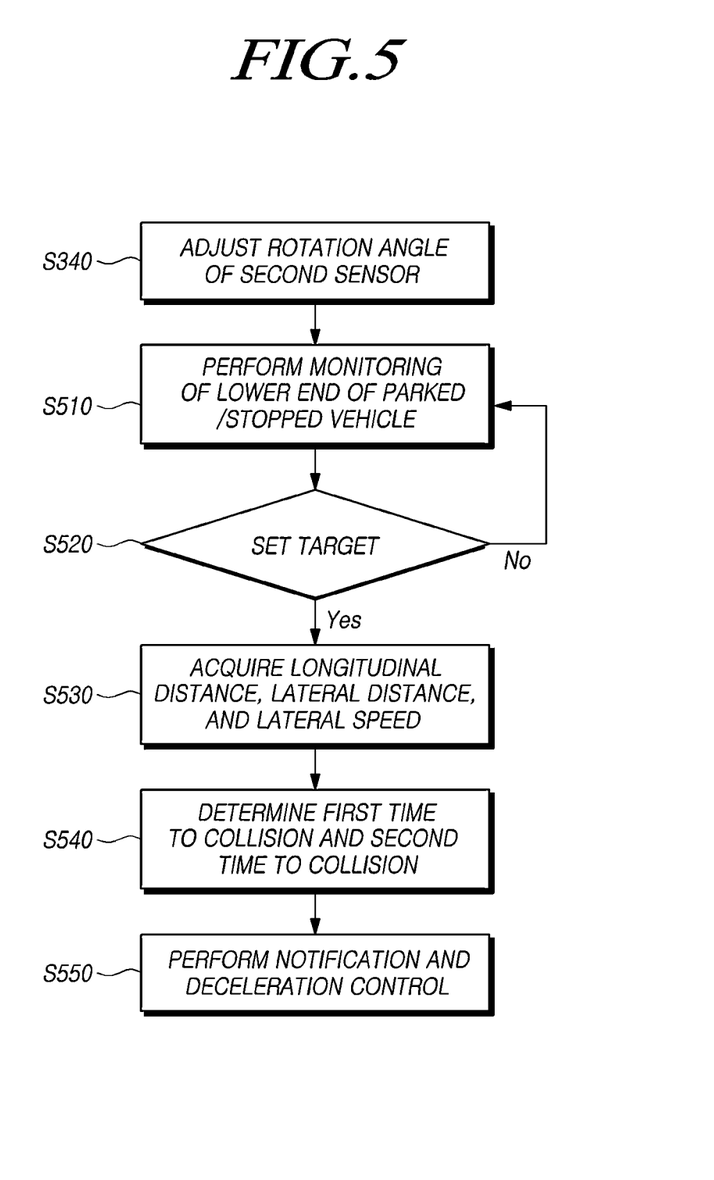
FIG. 5 is a flowchart illustrating an operation of setting a target and determining a time to collision according to one embodiment of the present disclosure.

FIG. 5 is a flowchart illustrating an operation of setting a target and determining a time to collision according to one embodiment of the present disclosure.

Referring to FIG. 5, the angle adjuster (120) according to one embodiment of the present disclosure may adjust the rotation angle of the second sensor (S340). As one example, if a parked/stopped vehicle is positioned on the left side, the angle adjuster (120) may adjust the rotation angle such that the second sensor attaches to the lower end of the vehicle rotates to the left side. If a parked/stopped vehicle is positioned on the right side, the angle adjuster (120) may adjust the rotation angle such that the second sensor attaches to the lower end of the vehicle rotates to the right side.

The controller (130) according to one embodiment of the present disclosure may perform monitoring of the lower end of a parked/stopped vehicle using the second sensor (S510). As one example, the rotation angle is adjusted such that the parked/stopped vehicle enters the inside of the field of view of the second sensor, and the controller (130) may perform monitoring of the lower end of the parked/stopped vehicle based on the information acquired through the second sensor. The second sensor is attached to the lower end of the vehicle and may be appropriate for monitoring the lower end of the parked/stopped vehicle.

The controller (130) according to one embodiment of the present disclosure may set a moving object as a target (S520). As one example, if an object moving at the lower end of the parked/stopped vehicle is recognized using the second sensor, the controller (130) may set the recognized moving object as a target. For example, if a moving object is recognized by detecting a position, movement, and the like of the object on the side face on which the parked/stopped vehicle is positioned using the second sensor, the controller (130) may intensively perform monitoring of the recognized moving object by setting the object as a target.

If the target is set, the controller (130) according to one embodiment of the present disclosure may set a longitudinal distance, a lateral distance, and a lateral speed (S530). As one example, the controller (130) may acquire the longitudinal distance and the lateral distance from the vehicle with reference to the set target from information monitored using the second sensor and acquire the lateral speed of the target. In addition, as necessary, the controller (130) may acquire the longitudinal distance, the lateral distance, and the lateral speed from the information measured using the first sensor together.

The controller (130) according one embodiment of the present disclosure may determine a first time to collision and a second time to collision (S540). As one example, the controller (130) may determine a time to collision between the vehicle and the set target and may determine the likelihood of a collision with the vehicle. In addition, the controller (130) may determine the time to collision including the first time to collision and the second time to collision using at least one of the lateral speed, the longitudinal distance, or the lateral distance of the target that has been acquired. For example, the controller (130) may determine the first time to collision as a ratio of the longitudinal distance to the speed of the vehicle. Then, the controller (130) may determine the second time to collision as a ratio of the difference value between lateral distance and lateral speeds to the lateral speeds. In addition, the controller (130) may determine the second time to collision as a ratio of a difference value between the lateral distance and the lateral movement distance to the lateral speed. In such case, the lateral movement distance may be determined using a movement distance of the target moved for one second in the lateral direction and the lateral speed (630) of the target. Thus, the controller (130) may determine the second time to collision as a ratio of a difference value between the lateral distance and a movement distance of the target moved for one second in the lateral direction to the lateral speed. The controller (130) according to one embodiment of the present disclosure may perform notification and deceleration control (S550). As one example, if the time to collision is determined to be shorter than a first reference time set in advance, the controller (130) may perform control such that a notification is given to the vehicle. In addition, the controller (130) may perform control such that the vehicle performs partial braking if the time to collision is determined to be shorter than a second reference time set in advance and may perform control such that the vehicle performs emergency braking if the time to collision is determined to be shorter than a third reference time set in advance. On the other hand, the controller (130) may perform control such that a notification is given together with performing braking.

Figure 6:
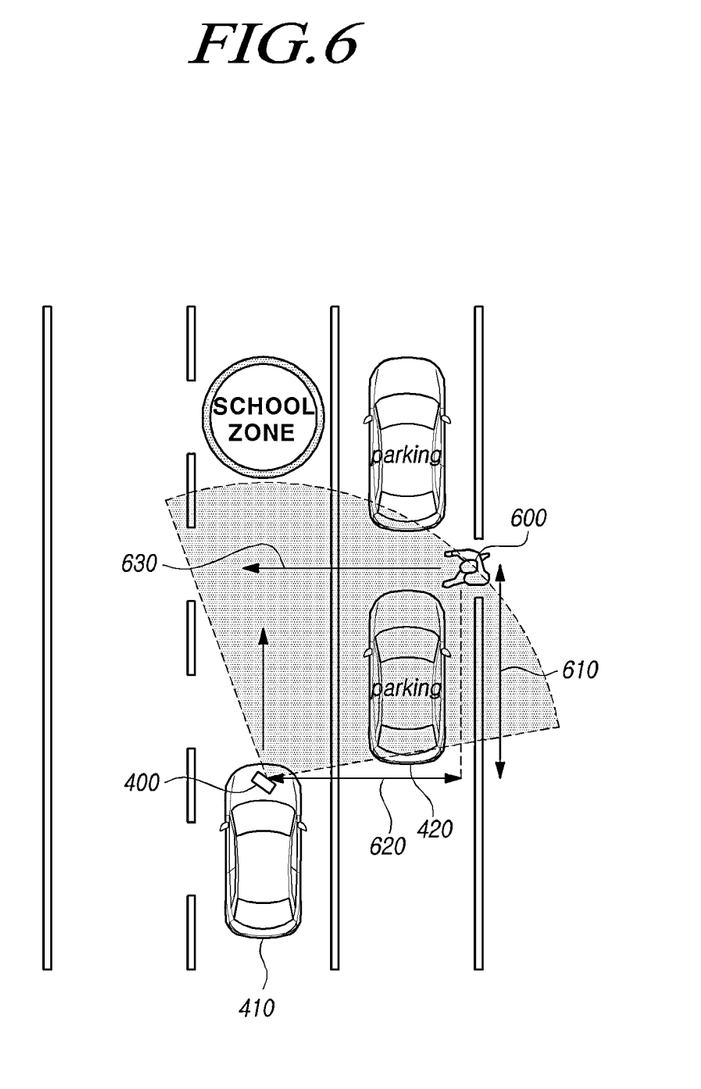
FIG. 6 is a diagram illustrating an operation of controlling notification and deceleration in accordance with a time to collision according to one embodiment of the present disclosure.

FIG. 6 is a diagram illustrating an operation of controlling notification and deceleration in accordance with a time to collision according to one embodiment of the present disclosure.

Referring to FIG. 6, a specific operation of the controller (130) according to one embodiment of the present disclosure controlling notification and deceleration according to a time to collision can be described. As one example, the controller (130) may determine the first time to collision as a ratio of the longitudinal distance (620) to the speed of the vehicle. Here, the longitudinal distance (620) may be a relative lateral distance between the vehicle and the target (600). As another example, the controller (130) may determine the second time to collision as a ratio of the difference value between lateral distance (610) and lateral speeds (630) to the lateral speeds (630). In addition, the controller (130) may determine the second time to collision as a ratio of a difference value between the lateral distance (610) and the lateral movement distance to the lateral speed (630). More specifically, the lateral distance (610) may be a relative longitudinal distance between the vehicle and the target (600), and the lateral speed (630) may be a lateral speed (lateral velocity) of the target (600) moving to the vehicle side. In addition, the lateral movement distance may be determined using a movement distance of the target moved for one second in the lateral direction and the lateral speed (630) of the target. Here, the target (600) may be a moving object detected at the lower end of the parked/stopped vehicle (420) using the second sensor (400). However, in a case where a moving object moves on a side opposite to the vehicle, the object may be excluded from the target (600).

The controller (130) according to one embodiment of the present disclosure may determine the likelihood of a collision using the time to collision (TTC) with the determined target (600) and control notification or deceleration of the vehicle. For example, if the first time to collision and the second time to collision, which have been determined, are determined to be shorter than the first reference time, the controller (130) may perform control such that a notification is given to the vehicle. Here, the first reference time may be set to two seconds but is not limited thereto. As another example, if the first time to collision and the second time to collision, which have been determined, are determined to be shorter than the second reference time, the controller (130) may perform control such that the vehicle performs partial braking. In addition, the controller (130) may perform control such that partial braking is performed by changing a braking force based on a difference the time to collision and the second reference time. Here, the second reference time may be set to 1.5 seconds but is not limited thereto. As another example, if the first time to collision and the second time to collision, which have been determined, are determined to be shorter than the third reference time, the controller (130) may perform control such that the vehicle performs emergency braking. Here, the third reference time may be set to 0.8 seconds but is not limited thereto.

If a collision is predicted as a result of the determination using the time to collision, the controller (130) according to one embodiment of the present disclosure may perform control such that deceleration is performed through any one of autonomous emergency braking (AEB) or adaptive cruise control (ACC). For example, if deceleration through partial braking or emergency braking is performed, the controller (130) may perform control such that a deceleration of the vehicle is determined based on a distance between the vehicle and another vehicle on the rear side, speeds of the vehicle and the other vehicle, and a deceleration of the other vehicle on the rear side, and deceleration is performed. However, if a collision with a target is predicted even through braking, the controller (130) may perform control such that steering for moving to another lane is performed. Alternatively, if a collision with another vehicle is predicted due to deceleration, the controller (130) may perform control such that steering for moving to another lane is performed. As another example, if a collision is predicted, the controller (130) may perform control such that a notification is given to the vehicle, and a notification is also given to the target or the other vehicle on the rear side.

Hereinafter, a vehicle control method that can be performed by the vehicle control apparatus described with reference to FIGS. 1 to 6 will be described.

Figure 7:
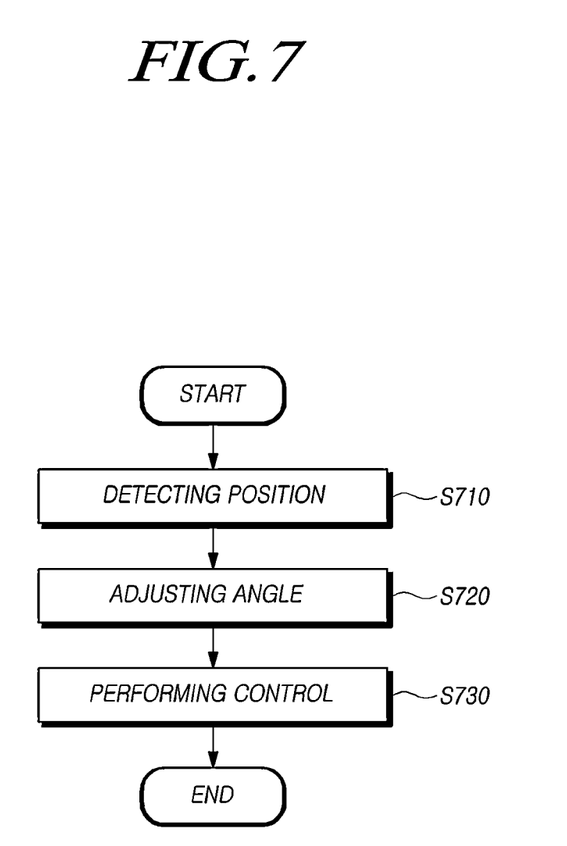
FIG. 7 is a flowchart of a vehicle control method according to one embodiment of the present disclosure.

FIG. 7 is a flowchart of a vehicle control method according to one embodiment of the present disclosure.

Referring to FIG. 7, the vehicle control method according to the present disclosure may include: a position detecting step (S710) of detecting whether a parked/stopped vehicle is positioned. As one example, the vehicle control apparatus may detect another vehicle positioned within a predetermined distance from the vehicle using the first sensor of the vehicle. In addition, vehicle control apparatus may determine whether or not the other vehicle detected based on a relative speed of the other vehicle acquired using the first sensor of the vehicle corresponds to a parked/stopped vehicle. For example, the vehicle control apparatus may detect objects present on a front side, a front lateral side, and a rear lateral side of the vehicle using the first sensor and acquire information about a distance, a relative speed, and a relative acceleration between the vehicle and a detected object. Here, the first sensor may be configured using one or more various known sensors including a camera, an infrared camera, a radar, a lidar, an ultrasonic wave, and the like installed at positions appropriate for detecting the front side of the vehicle. The first sensor may be installed at a room mirror, a grille, a position near a headlamp, and the like for detecting objects on the front side of the vehicle. However, the configuration is not limited thereto.

As another example, the vehicle control apparatus may detect whether a parked/stopped vehicle is positioned on the left side or the right side with reference to a traveling direction of the vehicle using the first sensor. For example, the vehicle control apparatus may determine a parked/stopped vehicle that is the closest from the vehicle among parked/stopped vehicles determined using the first sensor. Then, the vehicle control apparatus may detect whether the closest parked/stopped vehicle is positioned on the left side or the right side with reference to the traveling direction of the vehicle.

The vehicle control method may include an angle adjusting step of adjusting a rotation angle of a second sensor (S720). As one example, the vehicle control apparatus may adjust a rotation angle of the second sensor attached to a lower end of the vehicle on a side face on which the parked/stopped vehicle is positioned. For example, the vehicle control apparatus may adjust a rotation angle such that the second sensor is rotated based on the traveling direction of the vehicle and the position of the parked/stopped vehicle. Here, the second sensor is an additional sensor other than the first sensor and may be various known sensors such as a camera, an infrared camera, a radar, a lidar, ultrasonic waves, and the like attached to a lower end of the vehicle on the front side to be appropriate for detecting a lower end on the front side and a lower end on the front lateral side. However, the configuration is not limited thereto. In addition, the second sensor may be installed to be able to adjust the rotation angle. More specifically, although the second sensor may use a motor or the like for adjusting the rotation angle, the second sensor may use any as long as it corresponds to a device that is able to adjust the rotation angle.

As another example, the vehicle control apparatus may set a threshold range of the rotation angle based on a field of view (FOV) of the second sensor and adjust the rotation angle within the threshold range in accordance with movement of the vehicle with reference to the parked/stopped vehicle. For example, if the field of view of the second sensor is equal to or larger than 100 degrees, the vehicle control apparatus may set the threshold range of the rotation angle of the second sensor to be within 45 degrees. Thus, if the second sensor is rotated within 45 degrees before the vehicle catches up with the parked/stopped vehicle, the vehicle control apparatus may be able to perform monitoring of a lower part of the parked/stopped vehicle. However, this is an example, and the configuration is not limited thereto.

The vehicle control method may include a control step of controlling notification or deceleration based on a target (S730). As one example, the vehicle control apparatus may perform monitoring of a lower end of the parked/stopped vehicle using the second sensor and set a moving object as a target. In addition, the vehicle control apparatus may control notification or deceleration based on the set target.

As another example, the vehicle control apparatus may perform control of notification or deceleration based on the set target. In addition, the vehicle control apparatus may determine a time to collision (TTC) with the target based on the lateral speed, the longitudinal distance, and the lateral distance that have been acquired. For example, the vehicle control apparatus may determine a time to collision including a first time to collision and a second time to collision using at least one of the acquired lateral speed, longitudinal distance, or lateral distance that has been acquired. Here, the first time to collision may be a ratio of the longitudinal distance to the speed of the vehicle, and the second time to collision may be a ratio of the difference value between lateral distance and lateral speeds to the lateral speeds.

As another example, the vehicle control apparatus may compare the determined time to collision with the target with a reference time set in advance and perform control such that a notification is given to the vehicle, or the vehicle is decelerated. For example, if the first time to collision and the second time to collision are determined to be shorter than a first reference time, the vehicle control apparatus may perform control such that a notification is given to the vehicle. As another example, if the first time to collision and the second time to collision are determined to be shorter than a second reference time, the vehicle control apparatus may perform control such that the vehicle performs partial braking. In addition, as another example, if the first time to collision and the second time to collision are determined to be shorter than a third reference time, the vehicle control apparatus may perform control such that the vehicle performs emergency braking. On the other hand, the vehicle control apparatus may maintain provision of an alarm while performing partial braking or emergency braking.

As described above, according to the present disclosure, an apparatus and a method for controlling a vehicle capable of presenting a collision accident in advance can be provided. Particularly, an apparatus and a method for controlling a vehicle capable of preventing a collision accident in advance by expanding a detection area of a vehicle by monitoring a lower end of a parked/stopped vehicle by adjusting a rotation angle of a sensor attached to the lower end of the vehicle on a front side and predicting a situation having a risk for a collision that may occur due to a blind spot in advance can be provided.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A vehicle control apparatus comprising:
   a position detector configured to detect whether a parked or stopped vehicle is positioned on a left side or a right side with reference to a traveling direction of a vehicle using a first sensor of the vehicle;
   an angle adjuster configured to adjust a rotation angle of a second sensor attached to a lower end of the vehicle on a side on which the parked or stopped vehicle is positioned, the second sensor being attached to a front lower end of the vehicle; and
   a controller configured to set a moving object as a target by monitoring movement inside a lower end space of the parked or stopped vehicle using the second sensor and perform control based on the target such that a notification is given to the vehicle, or the vehicle is decelerated,
   wherein the controller acquires a lateral speed of the target and a longitudinal distance and a lateral distance between the vehicle and target using the second sensor, determines a time to collision (TTC) with the target, and compares the determined time to collision with a reference time set in advance,
   wherein the controller determines the time to collision including a first time to collision and a second time to collision using at least one of the lateral speed, the longitudinal distance, or the lateral distance; and
   wherein the first time to collision is a ratio of the longitudinal distance to a speed of the vehicle, and the second time to collision is a ratio of the difference value between the lateral distance and a lateral movement distance of the target to the lateral speed,
   wherein the controller:
   performs control such that the vehicle performs partial braking if the first time to collision and the second time to collision are determined to be shorter than a second reference time; and
   performs control such that the vehicle performs emergency braking if the first time to collision and the second time to collision are determined to be shorter than a third reference time.

2. The vehicle control apparatus according to claim 1, wherein the position detector detects another vehicle positioned within a predetermined distance from the vehicle using the first sensor and determines whether or not the other vehicle corresponds to the parked or stopped vehicle based on a relative speed of the detected other vehicle.

3. The vehicle control apparatus according to claim 1, wherein the angle adjuster sets a threshold range of the rotation angle based on a field of view (FOV) of the second sensor and adjusts the rotation angle within the threshold range in accordance with movement of the vehicle with reference to the parked or stopped vehicle.

4. The vehicle control apparatus according to claim 1, wherein, if the first time to collision and the second time to collision are determined to be shorter than a first reference time, the controller performs control such that a notification is given to the vehicle.

5. A vehicle control method comprising:
detecting whether a parked or stopped vehicle is positioned on a left side or a right side with reference to a traveling direction of a vehicle using a first sensor of the vehicle;
adjusting a rotation angle of a second sensor attached to a lower end of the vehicle on a side on which the parked or stopped vehicle is positioned, the second sensor being attached to a front lower end of the vehicle; and
setting a moving object as a target by monitoring movement inside a lower end space of the parked or stopped vehicle using the second sensor and performing control based on the target such that a notification is given to the vehicle, or the vehicle is decelerated,
wherein, in the setting of a moving object and performing of control, a lateral speed of the target and a longitudinal distance and a lateral distance between the vehicle and target using the second sensor are acquired, and a time to collision (TTC) with the target is determined, and the determined time to collision is compared with a reference time set in advance,
wherein, in the setting of a moving object and performing of control, the time to collision including a first time to collision and a second time to collision are determined using at least one of the lateral speed, the longitudinal distance, or the lateral distance; and
wherein the first time to collision is a ratio of the longitudinal distance to a speed of the vehicle, and the second time to collision is a ratio of the difference value between the lateral distance and a lateral movement distance of the target to the lateral speed,
wherein, in the setting of a moving object and performing of control, control is performed such that the vehicle performs partial braking when the first time to collision and the second time to collision are determined to be shorter than a second reference time, and control is performed such that the vehicle performs emergency braking when the first time to collision and the second time to collision are determined to be shorter than a third reference time.

6. The vehicle control method according to claim 5, wherein, in the detecting of the position, another vehicle positioned within a predetermined distance from the vehicle is detected using the first sensor, and whether or not the other vehicle corresponds to the parked or stopped vehicle is determined based on a relative speed of the detected other vehicle.

7. The vehicle control method according to claim 5, wherein, in the adjusting of a rotation angle, a threshold range of the rotation angle is set based on a field of view (FOV) of the second sensor, and the rotation angle is adjusted within the threshold range in accordance with movement of the vehicle with reference to the parked or stopped vehicle.

8. The vehicle control method according to claim 5, wherein, in the setting of a moving object and performing of control, when the first time to collision and the second time to collision are determined to be shorter than a first reference time, control is performed such that a notification is given to the vehicle.

9. A vehicle control apparatus comprising:
a position detector configured to detect whether a parked or stopped vehicle is positioned on a left side or a right side with reference to a traveling direction of a vehicle using a first sensor of the vehicle;
an angle adjuster configured to adjust a rotation angle of a second sensor attached to a lower end of the vehicle on a side on which the parked or stopped vehicle is positioned; and
a controller configured to set a moving object as a target by monitoring movement inside a lower end space of the parked or stopped vehicle using the second sensor and perform control based on the target such that a notification is given to the vehicle, or the vehicle is decelerated,
wherein the controller is configured to:
acquire a lateral speed of the target and a longitudinal distance and a lateral distance between the vehicle and target using the second sensor, determine a time to collision (TTC) with the target, and compare the determined time to collision with a reference time set in advance;
determine the time to collision including a first time to collision and a second time to collision using at least one of the lateral speed, the longitudinal distance, or the lateral distance, wherein the first time to collision is a ratio of the longitudinal distance to a speed of the vehicle, and the second time to collision is a ratio of the difference value between the lateral distance and a lateral movement distance of the target to the lateral speed;
perform control such that the vehicle performs partial braking if the first time to collision and the second time to collision are determined to be shorter than a second reference time; and
perform control such that the vehicle performs emergency braking if the first time to collision and the second time to collision are determined to be shorter than a third reference time.

10. The vehicle control apparatus according to claim 9, wherein the second sensor is attached to a front lower end of the vehicle.

11. The vehicle control apparatus according to claim 10, wherein the position detector detects another vehicle positioned within a predetermined distance from the vehicle using the first sensor and determines whether or not the other vehicle corresponds to the parked or stopped vehicle based on a relative speed of the detected other vehicle.

12. The vehicle control apparatus according to claim 10, wherein the angle adjuster sets a threshold range of the rotation angle based on a field of view (FOV) of the second sensor and adjusts the rotation angle within the threshold range in accordance with movement of the vehicle with reference to the parked or stopped vehicle.

13. The vehicle control apparatus according to claim 9, wherein, if the first time to collision and the second time to collision are determined to be shorter than a first reference time, the controller performs control such that a notification is given to the vehicle.

* * * * *